United States Patent [19]

Sy

[11] Patent Number: 4,577,313
[45] Date of Patent: Mar. 18, 1986

[54] ROUTING MECHANISM WITH ENCAPSULATED FCS FOR A MULTI-RING LOCAL AREA NETWORK

[76] Inventor: Kian-Bon K. Sy, 432 Farmstead Dr., Cary, N.C. 27511

[21] Appl. No.: 616,754

[22] Filed: Jun. 4, 1984

[51] Int. Cl.⁴ .................................................. H04J 3/00
[52] U.S. Cl. ........................................ 370/88; 371/37; 370/89
[58] Field of Search ............................ 370/14, 88, 89; 340/825.05; 371/37

[56] References Cited

U.S. PATENT DOCUMENTS

| Re. 28,811 | 5/1976 | Pierce | 370/88 |
|---|---|---|---|
| 3,742,144 | 6/1973 | Brandenburg et al. | 370/88 |
| 3,890,471 | 6/1975 | Hachenburg | 370/88 |
| 4,035,770 | 7/1977 | Sarle | 370/88 |
| 4,049,906 | 9/1977 | Hafner et al. | 178/2 C |
| 4,081,612 | 3/1978 | Hafner | 370/60 |
| 4,390,984 | 6/1983 | Sugiura et al. | 370/88 |
| 4,519,070 | 5/1985 | Bell | 370/88 |
| 4,527,270 | 7/1985 | Sweeton | 370/88 |

OTHER PUBLICATIONS

"Extendability Considerations in the Design of the Distributed Computer System (DCS)," Proceedings, National Telecommunications Conference, Nov. 1973, by D. J. Farber and J. J. Vittal.

Primary Examiner—Douglas W. Olms
Assistant Examiner—Kenneth I. Rokoff

[57] ABSTRACT

A method and apparatus for protecting the integrity of data in a multi-loop communication network is disclosed. A source station generates and forwards a frame with a unique format and a frame check sequence (FCS). At each bridge, an algorithm is provided to process the frame. If the frame is at a source bridge and not discarded, the FCS is preserved by encapsulating it in the Information field. The source bridge generates a new FCS, appends it to the frame and forwards the frame. Thereafter, each intermediate bridge generates its own FCS, appends it to the frame and forwards the frame. At the target bridge, no FCS is generated. The preserved FCS is forwarded as the FCS of the frame.

9 Claims, 13 Drawing Figures

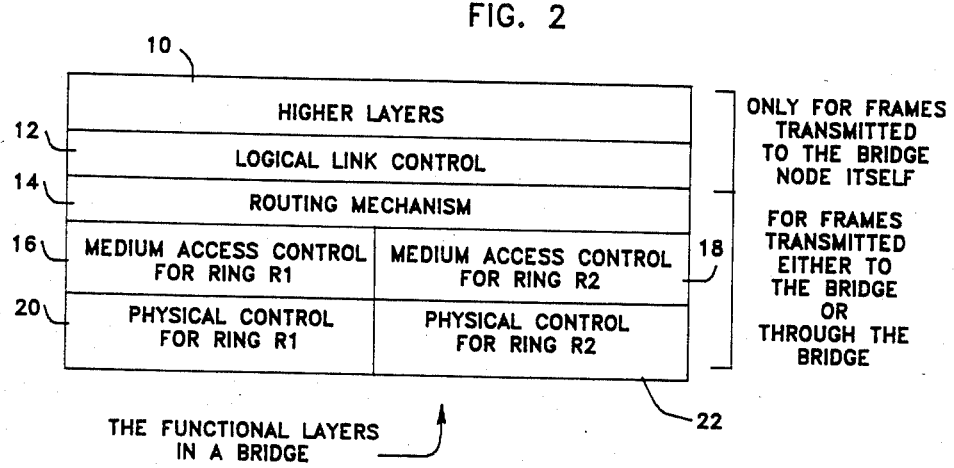

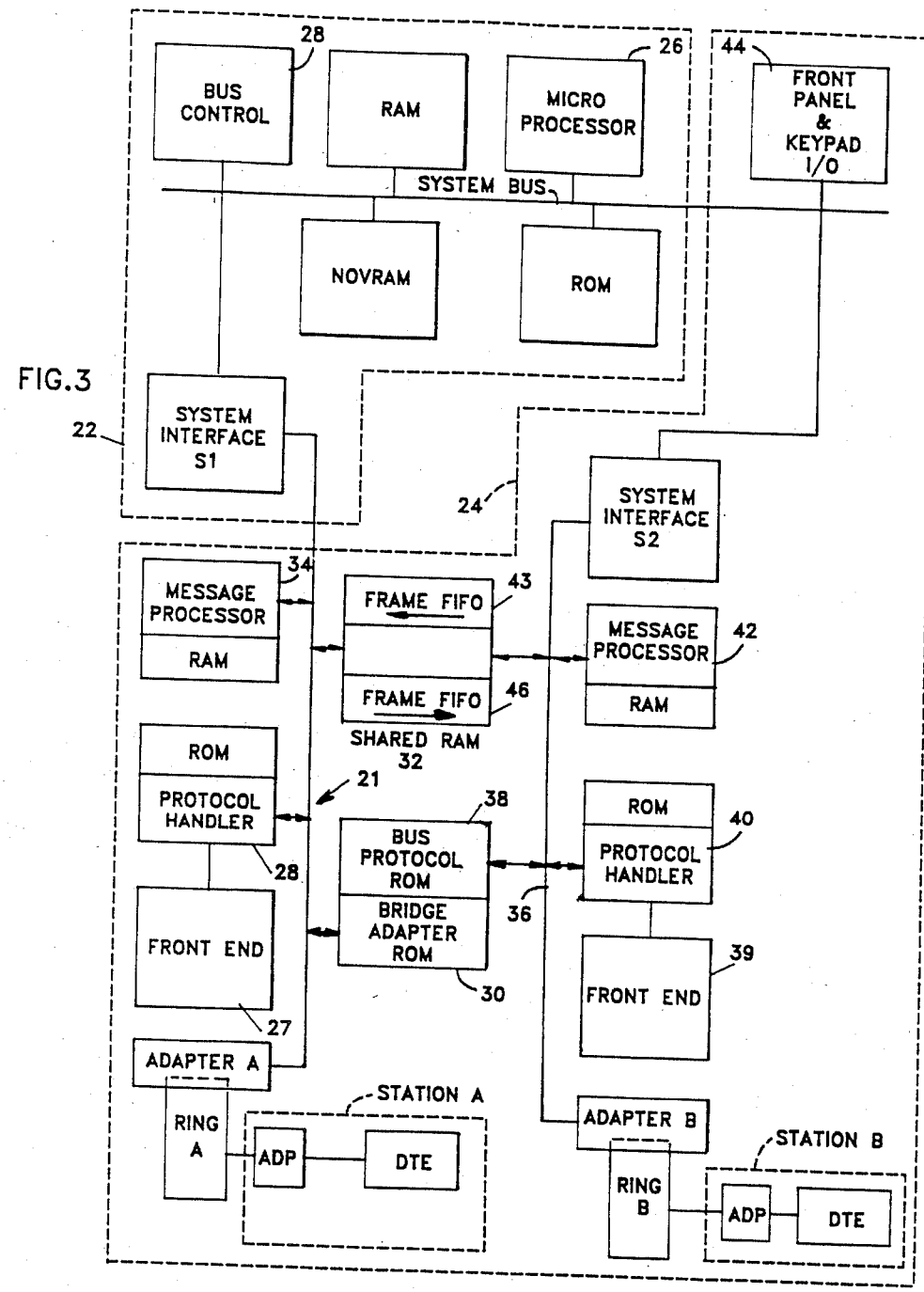

ROUTING MECHANISM WITH ENCAPSULATED FCS FOR A MULTI-RING LOCAL AREA NETWORK

CROSS REFERENCE TO RELATED PATENT APPLICATIONS

The present application relates to application Ser. No. 616,742, filed 6/4/84 by K. K. Sy and entitled, "Routing Architecture for a Multi-Ring Local Area Network." The referenced application provides a unique frame format and techniques for routing messages through a multi-ring communication network.

The present application provides a method for preserving the CRC or CRS until the frame reaches the destination ring.

BACKGROUND OF THE INVENTION

1. Field of the Invention

The present invention relates to communication systems in general and more particularly to ring or serial loop data communication systems.

2. Prior Art

In the past, several types of digital transmission arrangements have been proposed or used for transmitting data between a plurality of data sources. The single ring or serial loop configuration is one of the prior art arrangements. Essentially, this type of communication system includes a communication channel formed into a loop. One or more data sources are connected to adapters and the adapters are connected to the communication channel or wire. The adapters are arranged serially about the periphery of the loop. The configuration is such that data flows from a data source through its associated source adapter and serially through one or more intervening adapters. When the data reaches the target adapter, it is extracted from the loop and is subsequently forwarded to the target data source. If there are no intervening adapters, the data flows directly from the initiating data source/adapter through the loop and into the target data source/adapter. A more detailed description of single loop configurations is given in U.S. Pat. No. 3,890,471, issued to Victor Hachenburg on June 17, 1975. The copending patent application, Ser. No. 326,291, filed on Dec. 1, 1981, by P. A. Janson et al, entitled "Method of Transmitting Information Between Stations Attached to a Unidirectional Transmission Ring," and Ser. No. 463,470, filed on Feb. 3, 1983, by Tucker et al, entitled "Protocol for Determining Physical Order of Active Stations on a Token Ring," describes techniques for managing a single loop communication network. Both pending applications are assigned to the assignee of the present invention.

Another prior art configuration is the multi-loop or multi-ring arrangement. The multi-loop arrangement is best suited for an installation where a large number of data sources are to be connected. It is believed that the multi-ring configuration is more efficient than the single loop for handling a large number of data sources. The multi-loop arrangement consists of a plurality of independent single ring communication network interconnected to one another by one or more switching stations called bridges. Any data source or terminal on one ring may transfer messages to another terminal on the same or different rings. The switching of messages between rings is provided by the switching stations (bridges) which interconnect the rings.

U.S. Pat. No. RE28,811 (Ser. No. 410,813, filed Oct. 29, 1973, issued on May 11, 1976 to John Robinson Pierce) is an example of the prior art multi-loop communication system. In the patent a plurality of independent rings are interconnected, by switching stations, to form a single network. Messages are conveyed between stations by standardized message blocks. Each message block includes one or more address fields located at the head or beginning of each block. The switching stations use the contents of the address field for switching the messages between rings. A difference criterion is used for switching the message. Essentially, the switching station detects a destination code which is carried in the address field. The detected destination code is then compared with the code for the loop on which the message block is currently circulating. If the codes are different, the message block is switched to another interconnecting loop. The process continues until a match is obtained. This technique does not ensure that the message will traverse the optimum (i.e., shorted) path between source and destination.

U.S. Pat. No. 3,742,144 (Ser. No. 201,744 filed Nov. 24, 1971) describes another technique for routing messages in a digital multi-loop communication network. A Hamming distance criterion is used as the basis for switching messages between the loops.

U.S. Pat. No. 4,081,612 (Ser. No. 705,251 filed July 14, 1976, foreign priority Switzerland July 31, 1974) describes a technique for building up a routing address between stations interconnected by bearer channels and switching nodes.

U.S. Pat. No. 4,049,906 (Ser. No. 679,074 filed April 21, 1976, foreign priority Switzerland April 25, 1975) describes an apparatus for forwarding messages through the switching stations of a digital network with plural switching stations.

Still other prior art techniques for routing messages in multi-ring networks are described by D. J. Farber and J. J. Vittal in an article entitled, "Extendability Considerations in the Design of the Distributed Computer System (DCS)," Proceedings, National Telecommunications Conference, November, 1973.

THE PROBLEM

Several requirements must be met if data is to be routed reliably through a multi-ring data transmission system. One of the requirements is that end-to-end integrity of the data must be maintained. End-to-end data integrity is maintained if a recipient station receives the same cyclic redundant check (CRC) or frame check sequence (FCS) which was generated and sent (with a frame) from a source station. Stated another way, the CRC which a station appends to a frame should remain constant (that is, preserved) as the frame moves from one ring to the next. The CRC should not change as the frame passes through the network. By preserving the CRC, the recipient station uses it to check whether changes occur in the data during transmission.

Another requirement is that the integrity of the data must be maintained as the frame is switched between rings. This requirement is called intra-network data integrity. Intra-network data integrity is maintained if the FCS which a bridge generates and appends to a frame changes as the frame moves between bridges. Stated another way, when a bridge receives a frame, the bridge generates a CRC, appends it to the frame and forwards the frame. By changing the CRC, each bridge is given an opportunity to check if changes occur in the frame as it is routed between rings.

As is evident from the above, the requirements to preserve end-to-end data integrity and to maintain intra-network data integrity are inconsistent. While the former requirement demands that a constant CRC be transmitted with a frame, the latter requirement demands that a changing CRC must also be sent with the frame. This inconsistency raises a problem. To the best of our knowledge, it is believed that the prior art has not addressed this problem.

SUMMARY OF THE INVENTION

It is, therefore, the general object of the present invention to provide a transportation unit and technique which allows data integrity to be checked within the network and at the recipient station.

The invention provides a unique frame format for the transport unit which carries messages in the network. At each "Bridge" or switching station a programmed microprocessor interrogates the transport unit and depending on the settings of predetermined control bits the message is discarded or routed to its destination.

If the message is to be routed, the bridge checks its relative position on the route. If it is located on the source ring, the CRC (supplied by the source station) is placed in the Information (I) field. A new CRC is generated and appended to the message which is then forwarded. If the bridge is on the target ring, it does not calculate a new CRC; it forwards the message with the encapsulated CRC. If the bridge is an intermediate one, it calculates a new CRC, appends it to the message and then forwards the message.

In particular, the transport unit includes a control bit "U" positioned in the PCF1 (Physical Control Field 1) byte, an RI (Routing Information) field two control bits designated "L" positioned in the E-DEL (Ending Delimiter) byte and a frame check sequence (FCS) field. The "U" bit is the routing indicator and signifies the presence of an RI field. Likewise, the "L" bit is the last bridge indicator and signifies when the message passes through the last bridge.

The RI field further includes an address section and a control section. The address section contains the identification numbers for the bridges through which the message should be routed. Preferably, the identification number is provided by the station that initiates the message.

The FCS Field carries the cyclic redundant check (CRC) pattern. The pattern is generated by an initiating station and is used by a recipient station to check the integrity of the received data.

The control section of the RI field further includes a plurality of control bits which are used in conjunction with the previously mentioned "U" and "L" bits to facilitate routing and control of the message. The control section contains a B (Broadcast) bit, an LB (Limited Broadcast) bit and a D (Directional) bit.

In addition, the control section contains two sets of bits. One set represents a Length (LTH) field and carries a value representative of the number of bytes in the RI field. The other set represents a Pointer (PTR) field and carries a value which indicates (to a bridge) the identity of the next bridge that must process or switch the message.

A sending station generates and forwards a message in accordance with the above format. All of the above identified bits are initialized (set and/or reset) by the sending station. At each bridge the frame is analyzed in accordance with a predetermined algorithm. If the "U" bit is set, the frame is further analyzed to determine whether or not the frame should be forwarded. Frames that are copied are sent via a path identified by consecutive bridge numbers in the RI field. The value in the (PTR) field identifies the next bridge through which the frame will be transmitted to its ultimate destination. As the frame passes through the bridge, the PTR is adjusted (incremented or decremented) to identify the next bridge. When the frame arrives at the last bridge in the chain, the message is directed to the appropriate node where the message is extracted by a recipient station.

In addition, the last bridge uses the encapsulated CRC as the CRC for the frame. The last bridge also sets the last bridge indicator and restore the frame to the state it was in when it left the initiating station.

In order to send a "response" or message to the initiating station, the recipient station changes the "D" control bit to its opposite state and changes the value of the PTR. Preferably, if D=0 the PTR is set to identify the first bridge of the sequence. Alternately, if D=1 the PTR is set to identify the last bridge of the sequence.

Thus, a common frame format is provided for shuttling messages with end-to-end integrity through the multi-ring network. The relative positions of the bridge identification numbers, in the Routing Information field (RI field), give the sequence or order of the bridges through which the message will pass and the PTR gives the next bridge that will process the frame.

To this end, when a message is being transmitted from a sending station to a recipient station, the bridges are traversed in a first direction relative to the order in which the identification numbers of the bridges are recorded in the RI field. For response messages the bridges are being accessed in the opposite direction. The order in which the bridges are being accessed is determined by the value of the (PTR) field.

One feature of the invention provides a technique for removing expended messages from the network.

The foregoing features and advantages of the invention will be more fully described in the accompanying drawings.

BRIEF DESCRIPTION OF THE DRAWINGS

FIG. 2 is a schematic showing the logical structure of a bridge.

FIG. 3 is a schematic showing a hardware implementation for a bridge.

DETAILED DESCRIPTION OF THE PREFERRED EMBODIMENT

Before giving a detailed description of the drawings, it should be noted that there are many options for configuring rings into a multi-ring network using bridges as the interconnecting device. The FIGS. 1A-1E merely illustrate rings connected by bridges and should not be construed as a limitation on the scope of the present invention. The present invention is intended to route messages through any network comprising of a plurality of rings coupled into a single local area network by bridges. The topology of the network is of no moment to the present invention. The showing therefore is merely illustrative of the type of complex network within which the invention can be adapted.

Figure 1A:
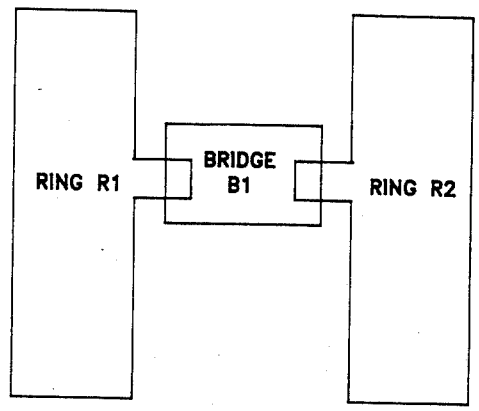
FIGS. 1A-1E show a plurality of schematics representing different types of multi-ring networks, each one being capable of embodying the present invention.

Referring now to FIGS. 1A–1E, there is shown a graphical representation of rings connected by one or more bridges. More particularly, FIG. 1A shows two rings, ring R1 and ring R2, connected by bridge B1.

Figure 1B:
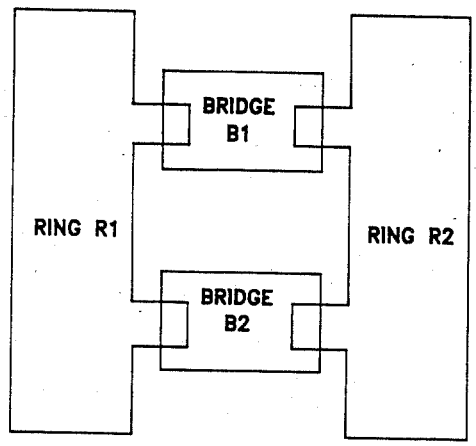

FIG. 1B shows two rings R1 and R2 connected by parallel bridges B1 and B2.

Figure 1C:
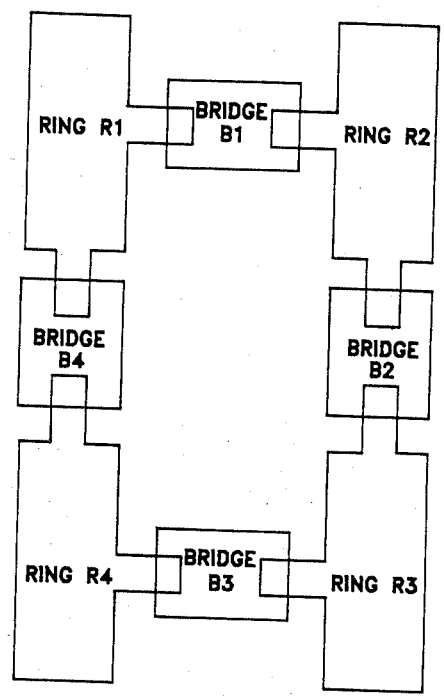

FIG. 1C shows a complex network consisting of four rings identified as R1, R2, R3 and R4 connected by four bridges B1, B2, B3 and B4. The combination of bridges and rings form a loop.

Figure 1D:
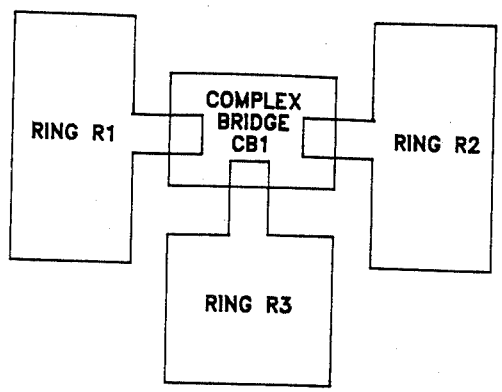

FIG. 1D shows a topology in which a complex bridge CB1, interconnects a plurality of rings R1, R2 and R3. A complex bridge is defined as that bridge which connects three or more rings. On the other hand, a simple bridge is one that interconnects two rings.

Figure 1E:
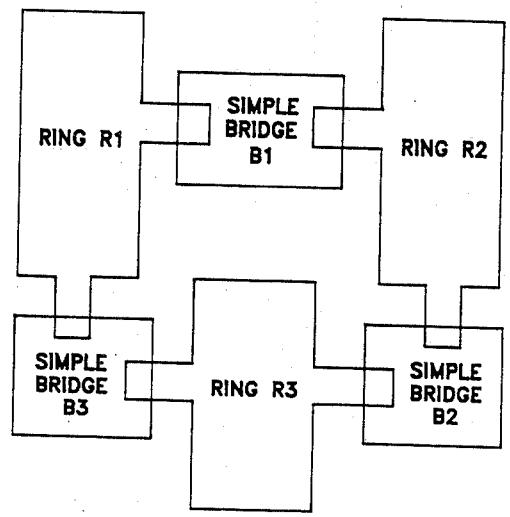

FIG. 1E shows a simple bridge B1, B2 and B3 interconnecting rings R1, R2 and R3. As stated above, the present invention is intended to be used in any type of multi-ring network.

FIG. 2 is a schematic illustrating the logical structure of the bridge. Preferably, the bridge is configured into a layered structure with the rings connected to the physical control layer. FIG. 2 represents a simple bridge capable of supporting two rings R1 and R2. The upper layers identified by numerals 10 and 12 are used to process frames transmitted to the bridge node itself. While the lower layers identified by numerals 14, 16, 18, 20, and 22 are used to process frames transmitted either to the bridge node (not shown) or through the bridge. As stated above, the bridge is the device that interconnects rings and routes messages from one ring to the next. Layers above the routing mechanism layer 14 need not be implemented if an end-user node is not connected to the bridge.

The operation of the bridge can be expressed in terms of the Local Area Network (LAN) model defined in IEEE 802.5 (Institute of Electrical and Electronics Engineers, Inc., Draft IEEE Standard 802.5, Token Ring Access Method and Physical Layer Specification, Dec. 1, 1983), as a Medium Access Control (MAC) level relay station. Essentially, logic link control procedures are implemented between pairs of source and destination stations, and not terminated, examined or affected by intervening bridges. The subject draft standard is incorporated herein by reference and can be referred for a more detailed description.

In the preferred embodiment of this invention routing occurs in the medium access control layer of the bridge. As such messages are not terminated, examined or affected by intervening bridges.

It is worthwhile noting that the alternative to routing in the medium access control layer would be to terminate all logical links in the bridge, and perform routing at the layer above logical link control. This alternative approach imposes a greater processing burden on each bridge, with little observable benefit. The similar transmission characteristics of the separate token rings make separate, different logical link controls unnecessary. In addition, the single address space of all stations in the network of token rings, coupled with the identical frame format in each ring, allows frames to flow through bridges largely unmodified unless prone to error. Finally, the multiple access nature of the local area network diminishes the need for multiplexing higher level, transport-like connections into single logical links or between bridges.

FIG. 3 shows a block diagram for a hardware embodiment of the logical bridge structure shown in FIG. 2. The portion of the bridge which is enclosed by broken lines 22 is used to process messages directed to a node (not shown) connected to the bridge. The present invention relates to a boxed-in structure only to the extent that the message is routed through the portion of the bridge closed by broken lines 24. Since the present invention is primarily concerned with the portion of the bridge which routes messages, only the elements in section 20 which are necessary to the understanding of the present invention will be described. To this end, system interface S1 is connected to local multiplexor bus 21. The function of the system interface is to accept messages which are routed through the bridge to a station connected thereto. The system interface accepts the message from multiplexor bus 21, performs certain functions on the message, and sends it upward to microprocessor 26. The microprocessor with its non-volatile RAM (NOVRAM) and ROM is coupled through appropriate connectors to a system bus and the system bus is controlled by bus control unit 28.

Still referring to FIG. 3, the bridge comprises of Bridge Adapters A and B, respectively. Adapter A is interconnected to ring A while adapter B is interconnected to ring B. Each ring carries a plurality of stations. In FIG. 3, only one station identified as station A is coupled to ring A and station B is coupled to ring B. Each station comprises of a device adapter (ADP) and a data terminal equipment DTE connected to the device adapter. Information onto the ring is generated in the data terminal equipment and flows through the device adapter onto the ring. Likewise, data is extracted from the ring by the device adapter and into the data terminal equipment. Such configurations are well known in the art and a detailed description will not be given.

The Bridge Adapter A is connected to multiplexor bus 21. The multiplexor bus is also connected to protocol handler (PH) 28, bridge adapter ROM 30, shared RAM 32, and message processor (MP) 34. A front end module 27 is connected to protocol handler 28.

Likewise, adapter B is connected to local multiplexor bus 36. The multiplexor bus 36 is connected to bus protocol ROM 38, protocol handler (PH) 40, and message processor (MP) 42. Front end module 39 is connected to the protocol handler. A front panel and the keypad I/O means 44 is connected through system interface S2 to local multiplexor bus 36. The front panel and keypad I/O means 44 is used to enter information into the bridge and to display operating information relative to the bridge. Likewise, the function of the bus protocol ROM is to store permanent information relative to the control of the bus. The bridge adapter ROM stored permanent information to control the adapters. The front end modules contain circuitry for generating and handling signals in the bridge. For example, the crystal and clocking circuits are preferably located in the front end modules. The protocol handlers with associated ROM handle the protocol which is used to enable a bridge to gain access to the network. The message processors contain the algorithms (to be described later)

that process the frames which are routed through the bridge.

Still referring to FIG. 3, the bridge adapters A and B contain the circuitry necessary to transmit data onto and to receive data from the ring. The adapter contains sufficient memory for buffering both outgoing and incoming frames. The bridge adapters further contain DMA (Direct Memory Access) channels (not shown) which control the transfer of frames between the shared RAM 32 and the transmission medium of the ring. The adapters further contain a microprocessor (not shown) whose major tasks are to manage frame buffers, set up the DMA channels and control the interface to the message processor. The shared RAM 32 is an 8k byte static RAM capable of interfacing with local buses 21 and 36, respectively. Preferably, the clock phases of the two local buses will be 180° out of phase and the data fed to the shared RAM from the local buses is interleaved cycle by cycle. To this end, frames which are directed from ring B to ring A are stored into the section of the RAM identified by numeral 44 and are then fed out in a first-in, first-out fashion. Similarly, frames which are directed from ring A to ring B are stored in the section of the RAM designated by numeral 46 and is fed out in a first-in, first-out manner to local multiplexor bus 36. In the referenced embodiment, the size of the shared buffer is 8k.

Figure 4:
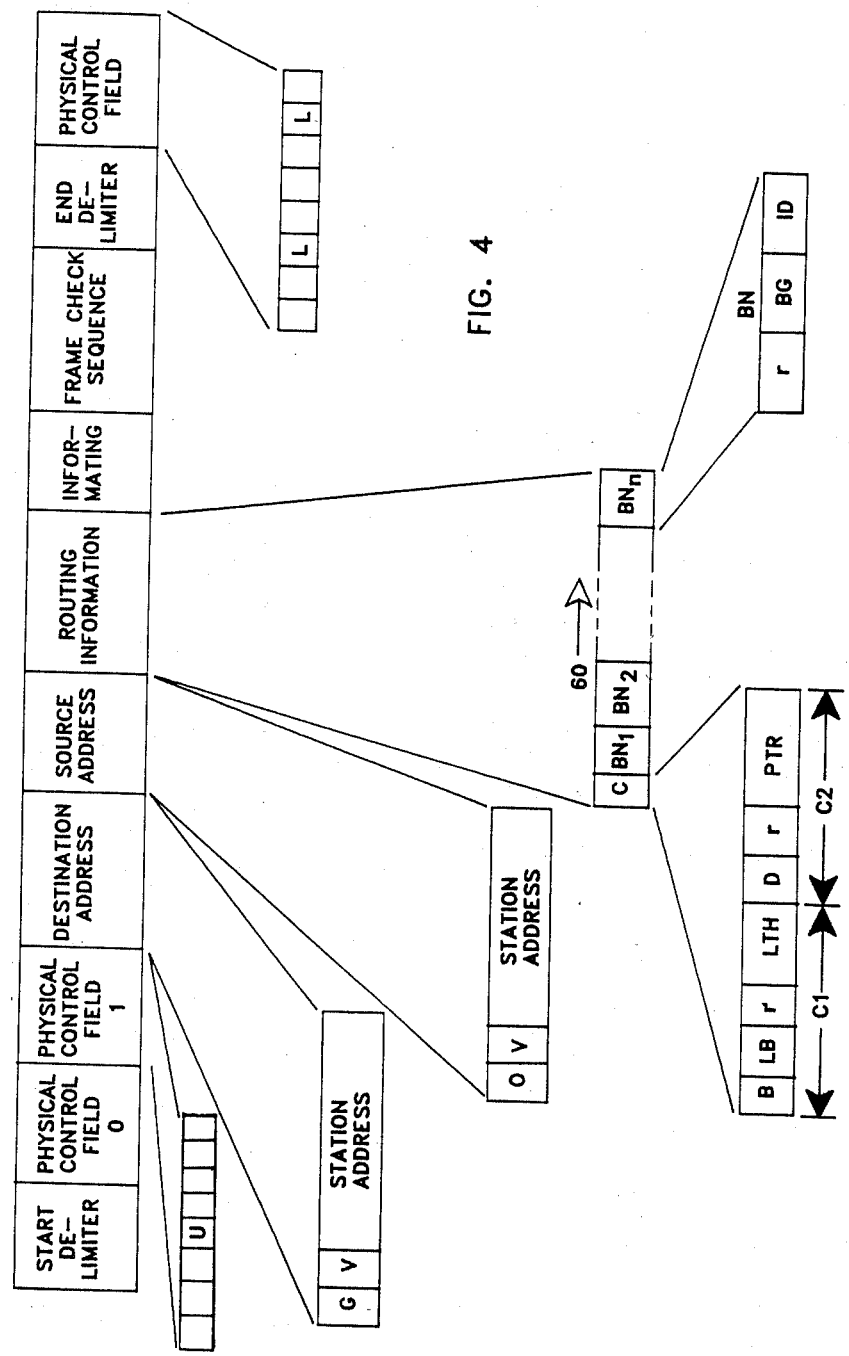
FIG. 4 shows the frame format according to the teaching of the present invention.

FIG. 4 shows a novel frame format according to the teaching of the present invention. The format is used for routing messages throughout the multi-ring network. The format comprises of a starting delimiter (SD) field, a physical control field (PCF), a destination address (DA) field, a source address (SA) field, a routing information (RI) field, an information (INFO) field, a frame check sequence (FCS) field, an ending delimiter (EDEL) field, and a physical control (PCF-E) field. Except for the RI field and certain bits in the physical controlled fields the other fields in the format are substantially the same as described in the draft IEEE standard 802.5, Token Ring Access Method and Physical Specification, Dec. 1, 1983. This document is incorporated herein by reference and can be referred to for a detailed description of the enunciated fields.

Still referring to FIG. 4, Bit 3 (the fourth most significant bit) of the physical control field (PCF-1) is defined as the routing field (U) indicated. When this bit is set to a predetermined value by the transmitter of a frame, an RI field is included in the frame. If the bit is not set to the predetermined value, then there is no RI field and a bridge will not process the information. In the preferred embodiment of this invention, the routing field indicator bit (U) is set to logical "1". A transmitter can optionally omit the RI field in frames that will never leave the ring. This allows stations that are designed to operate on only a single ring to co-exist with stations that support the RI field for multi-ring operation. For multi-ring operation the limited station only examines the "U" bit and discards frames in which the "U" bit is set.

Still referring to FIG. 4, an expanded graphical representation of the PCF-E field is shown. The PCF-E field is one byte long and bit 2 (the third most significant bit) and bit 6 (the seventh most significant bit) are defined as the last bridge (L) indicator. The purpose of the L bits are to detect circulating non-broadcast frames. These bits are set to a first value by a source station, and it shall be set by the last bridge along the path prior to forwarding the frame to the target ring. Once the bits are set, no other bridges in the network will forward the frame. In the preferred embodiment of this invention, the L bit is set to logical zero by the source station. Likewise, the last bridge in the chain sets the L bits to logical "1". With both L bits set to "1", the next bridge which receives the frame will not forward it.

It should be noted that a single "L" bit is permissible. However, doubling the L bit provides error checking capabilities. It is, therefore, assumed that a "0" in either position constitutes L="0". Likewise, both L bits must be "1" to constitute L=1. If the two positions differ, then a bit error has occurred. Additional forwarding will occur only if looping is possible. The bridge is then likely to catch the frame the next time around. However, it is preferred to have an additional pass around a loop rather than discarding a valid frame.

FIG. 4 shows the expanded structure for the RI field. The RI field is optional if the frame does not leave the ring. The RI field is mandatory if the frame leaves the ring. When the field is present, it has a variable length with a 2-octet routing control field (C) and up to m 2-octet bridge number fields; where m is limited by the length of one of the subfields within the routing control field. As will be explained subsequently, the bridge number fields identify the bridges through which a message is routed. The bridge numbered field is placed in the appropriate location by the source station. However, if a source station does not know the location of a particular target station, the bridge number field is omitted and as the message progresses through individual bridges towards the target station, each bridge that the message traverses enters its bridge number in the RI field. Thus, this unique message format can be used for delivering messages and it can be used to acquire the routing information through which the message must be routed. When the frame is used to acquire routing information, the length is adjusted as the frame passes through the bridge.

Still referring to FIG. 4, the control field (C) is 2 bytes or octets in length. The C1 byte contains a broadcast (B) bit, a Limited Broadcast (LB) bit, and a length (LTH) field. Likewise, the C2 byte contains a directional (D) indicator and a pointer (PTR). In the preferred embodiment of the invention the LTH Field and PTR field are five (5) bits.

The function of these bits is as follows:

Broadcast (B): This bit, when set to a predetermined value, indicates that the frame is destined for all rings. It does not imply that the frame is destined for all stations on all rings. In the preferred embodiment of this invention, the predetermined value is logical "1".

Limited Broadcast (LB): This bit (i.e., the LB bit) is used in conjunction with the B bit. The limited broadcast bit indicates to a bridge that this is a limited broadcast frame. The bit is set when there is a requirement for the stations to receive only a single copy of broadcast frames. Limited Broadcast requires a path to be identified such that broadcast frames can reach to all stations from any station in the network. Bridges that are configured not to process Limited Broadcast will discard the frame. The decision to reject Limited Broadcast frames is set when a bridge is initialized. As was stated previously, information can be entered into the bridge from the front panel and keypad I/O means (FIG. 3).

Length (LTH): This field has a predetermined number of bits and is used to indicate the length of the RI field in bytes. For a broadcast frame, this field is set to 2 by the transmitting station. When the frame is forwarded, this field is incremented by 2. For a non-broadcast frame, this field is used to indicate the length of the RI field and remains unchanged when the frame travels through the sub-network.

As stated before, for a broadcast frame the length field is initialized at 2 by the transmitting station and is incremented by 2 by every bridge that forwards the frame and places its identification number in a new bridge number field. The length of the RI field also furnishes a basis for comparison with a bridge's hop-count, where it reflects a number of hops (LTH−2)/2, that a frame has taken so far. For a non-broadcast frame already carrying routing information, the field indicates the length of the RI field, and remains unchanged as the frame traverses the network. In the preferred embodiment of this invention 5 bits are allotted for the length field. This allows the number of bridges m in a route to be as high as 14.

Direction (D): This bit indicates to a bridge whether to increment or decrement the pointer (PTR), to be described below, when it forwards a frame. In the preferred embodiment of this invention, if D=0, the pointer is incremented by 2; otherwise, it is decremented by 2. Basically, the direction bits indicate whether the frame is traveling from the originating station (that sent the message) to the target or the other way around. Its use allows the list of bridges in the RI field to appear in the same order for frames traveling in both directions along the route. Thus, the directional bit allows a common frame to shuttle information bidirectionally between a message originator and its target without changing the order of the bridge numbers in the RI Field.

The D bit is never changed in transit. For broadcast frames, the transmitting station sets a D=0. Bridges do not need the D bit in broadcast frames, but receivers could uniformly complement the received D bit when they gleam routing information from frames with RI fields. Thus, for non-broadcast frames, the originator of the "Resolve" normally sets D=0. As is used herein, Resolve is defined as a broadcast message used by a source station to obtain a route to a target station. The "Resolve Response" is a non-broadcast frame which the target station forwards to a source station and contains the routing information. In all frames transmitted to the target, the target of the Resolve sets D=1 in all frames to the originator. The Resolve and Resolve response provides the originator with a bridge number vector, D-bit value, and length value which can then be transmitted to the target in the RI field of a non-broadcast frame. Both stations may store the values in their RI fields for use in all frames subsequently transmitted to each other.

Pointer (PTR) or next bridge pointer (NBP): This 5-bit field points to a particular place in the RI field of non-broadcast frames where the number of the next bridge designated to forward the frame is stored. The pointer value is an offset in octets (bytes) from the beginning of the RI field. Since the length field is sufficient in broadcast frames to inform a bridge where to insert its bridge number, the next bridge pointer is optional in broadcast frames. If it is decided not to use these bits for broadcast frames, then their values are reserved (r).

In a non-broadcast frame, the initial setting of the pointer field by a source station depends on the value of the D bit. If D=0, the pointer is set to 2 (thus indicating the first bridge number in the list, while if D=1, the pointer is set to (LTH−2), the last bridge number in the list). The last bridge always returns a pointer to its original value, so that the source to destination frame check sequence can be used to check for errors. The use of the D bit and pointer field is summarized in the table below.

|  | DIRECTION BIT | |
| --- | --- | --- |
|  | D = 0 | D = 1 |
| Initial PTR Value | 2 | LTH-2 |
| Indication of First Bridge | PTR = 2 | PTR = LTH − 2 |
| Indication of Last Bridge | PTR = LTH − 2 | PTR = 2 |
| Not Last Bridge Action | PTR = PTR + 2 | PTR = PTR − 2 |
| Last Bridge Action | PTR = 2 | PTR = LTH − 2 |

It is worthwhile noting that the values assigned to the D Bit are merely exemplary and can be changed without departing from the scope and spirit of the present invention.

Still referring to FIG. 4, the structure for the bridge number (BN) field is shown. In the preferred embodiment of this invention each bridge number (BN) field is 2 octets long. The first two bits are reserved (r) for future use while the remaining 14 bits are divided into two sub-fields of lengths K and (14−K), respectively. The sub-field of K length is called the bridge group (BG) portion of the bridge number. While the sub-field of (14−K) length is called the individual bridge portion of the bridge number. The bridge number is unique to each bridge in the network and is assigned during an initialization procedure.

The sub-division of the bridge number allows parallel bridges to exist and share traffic between the same two rings. When parallel bridges are used between two rings, the parallel bridges share the same bridge group portion of the respective bridge numbers, and differ in only the individual bridge portion. A parallel bridge examines only the bridge group portion of the bridge numbers in the RI field of the broadcast frame to determine if its number is already in the list of bridges. If its bridge group portion matches a bridge group portion in the list, it will not forward the frame. By not forwarding frames that have already been forwarded by a bridge with the same bridge group number, the bridge prevents broadcast frames from ricocheting between two rings connected by parallel bridges. Complete bridge numbers are still inserted into broadcast frames and examined in non-broadcast frames. The value of K is simply a configuration parameter that is chosen to suit the needs of a particular establishment.

FIG. 4 also shows the structure for the address field. Basically, the structure is similar to the above referenced IEEE Draft Standard for MAC frames. The first bit identified as "G" is used as an address type designation to signify an individual or group address in the Destination Address (DA) Field. The bit is always set to "0" in the Source Address (SA) Field. The second bit identified as "V" shall be used to distinguish between locally or globally administered addresses. In an alternate structure the bits which are used to identify the station address are separated into a ring number section and a node address (adder) section.

This concludes the description of the frame format. Having described the unique frame format which is used as a transportion vehicle within the network, the algorithms which are provided at each bridge to analyze the frame will now be described.

As stated previously, before a frame is transmitted, an initiating station sets certain control bits within the frame. For a broadcast frame, D bit is always set to 0. For a non-broadcast frame, the setting of D bit depends on the relative position of BN. If BN identifies a route (in a forward direction) from a source station to a targeted station, the D bit will be set to a logical "0." If BN identifies a route in the reverse direction, then D bit will be set to a logical "1."

Turning to FIG. 4 for a moment, the forward direction is shown by arrow 60. When a message is moving in the forward direction, it is leaving an initiating station and the first bridge to process the message is $BN_1$, followed by BN2 and so on. Likewise, if the message is moving in the opposite direction, the first bridge to process the message is $BN_m$ followed by the bridges with lower bridge numbers.

Setting of the PTR by the transmitting station depends on the D bit. If D=0, the PTR will be set to 2. If D=1, PTR will be set to LTH−2.

Prior to forwarding a frame, a bridge needs to update the pointer. This again depends on the D bit. If D=0, the pointer is incremented by 2. If D=1, pointer is decremented by 2.

It should be noted that the combination of D bit and the pointer indicates to a bridge its relative position with respect to a given route. If D=0 and PTR=2, this indicates to a bridge that the frame is leaving the source ring. If D=0 and PTR=LTH−2, this indicates to a bridge that the frame will be forwarded to the target ring. D=1 and PTR=LTH−2 indicates to a bridge that the frame is leaving the source ring. D=1 and PTR=2 indicates to a bridge that the frame will be forwarded to the target ring.

With the aforementioned described setting, when a bridge sees a frame, a decision has to be made whether or not to forward the frame.

Figure 6A:
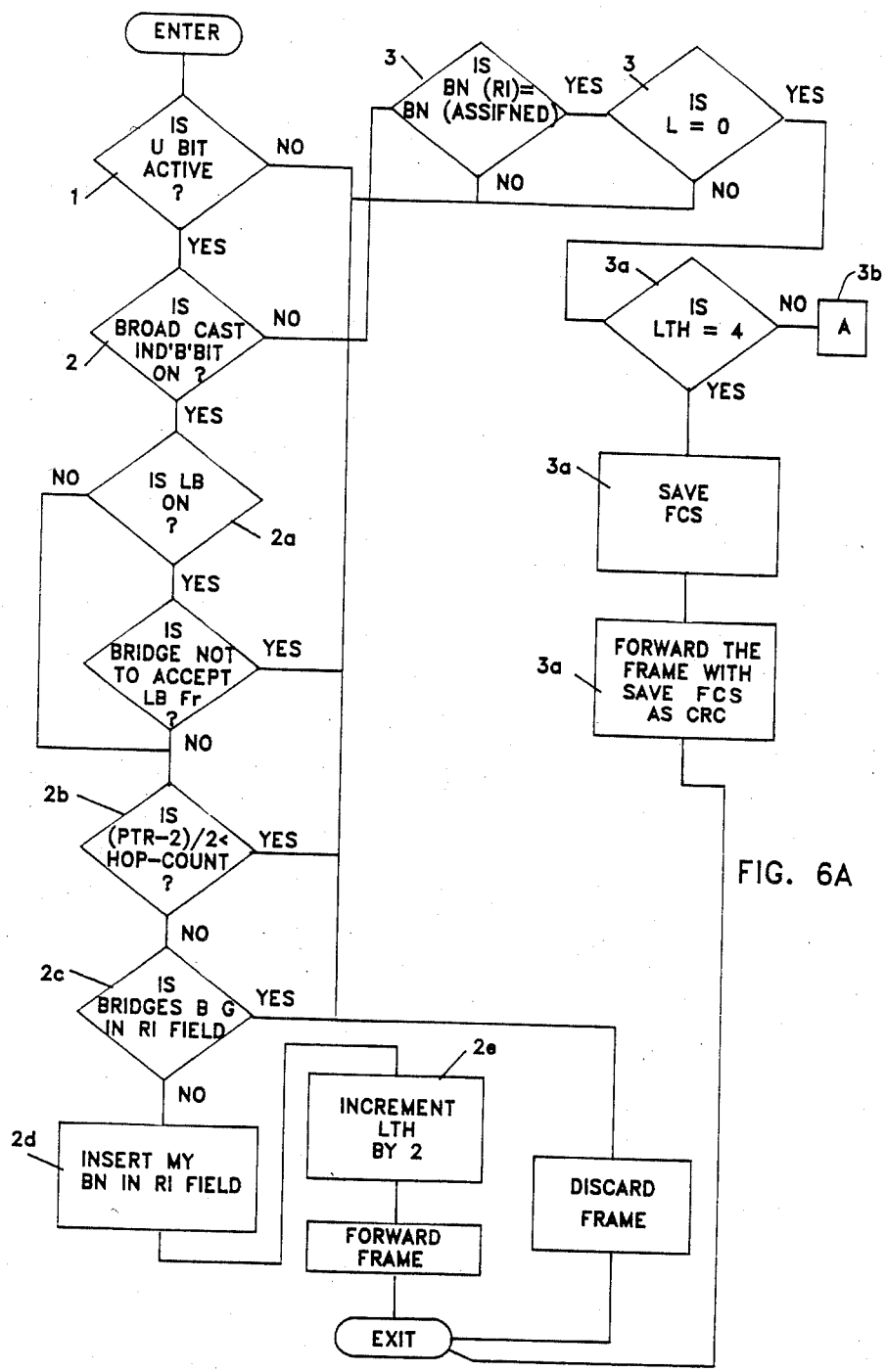
FIGS. 6A-6C show detailed algorithms for analyzing and processing the frame.
Figure 6B:
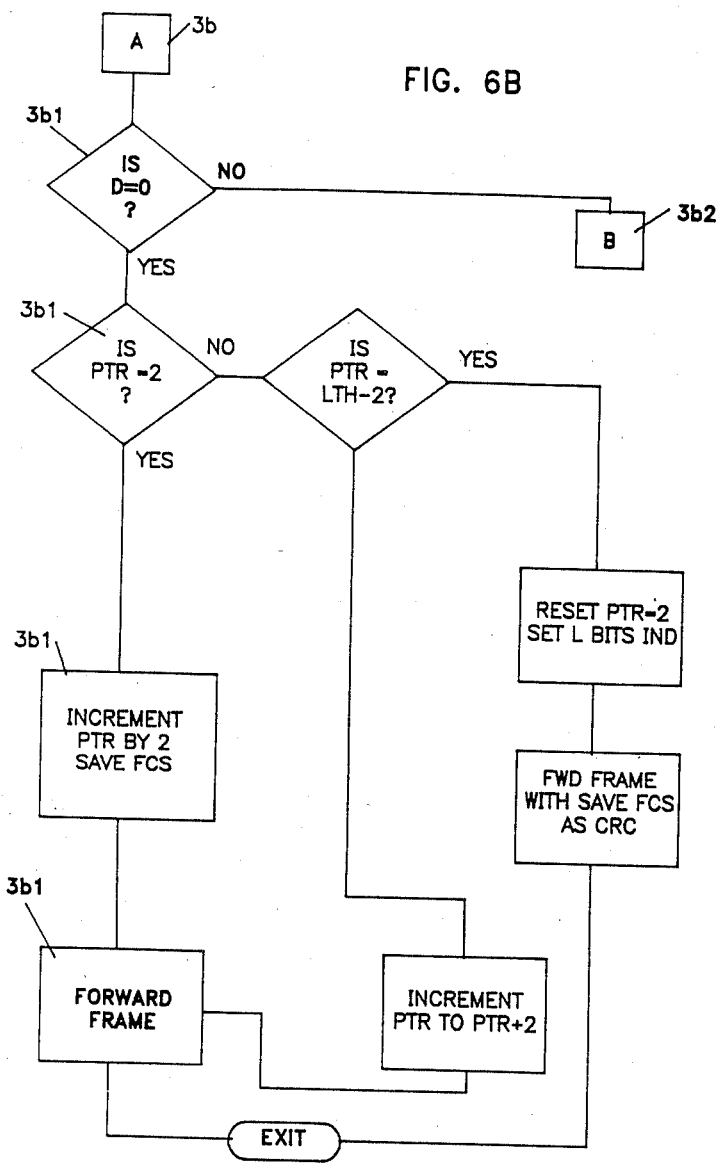
Figure 6C:
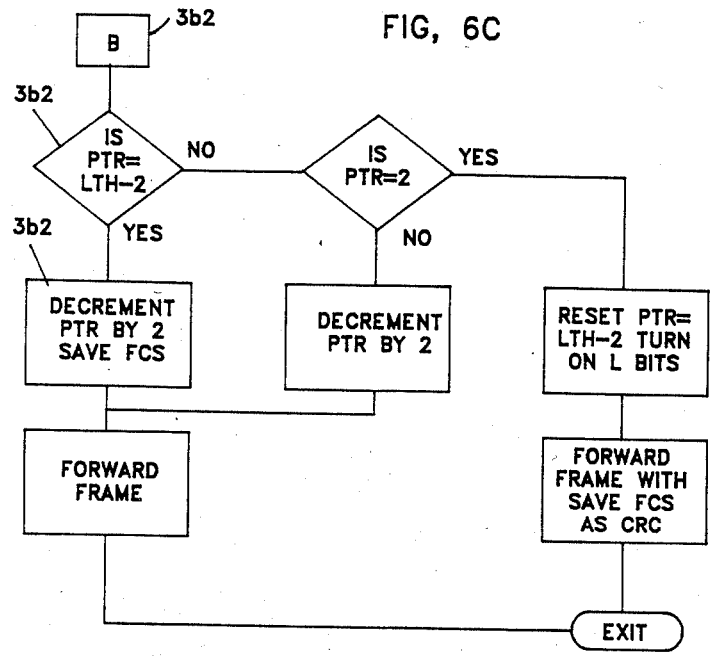

FIGS. 6A–6C show a set of detailed flow charts for the algorithms which are provided at each bridge to analyze the messages generated in accordance with the above described frame format and to guide the routing of a message through the network. To make the description less cumbersome, common alphanumeric characters are used to identify the below listed process steps and the blocks in the flow chart that perform each process step. Stated another way, in the text below the alphanumeric characters on the left identify the process steps and the description of the process is given on the right. In the flow charts the same alphanumeric character is used to identify the process step while the contents of the block is a short description of the function. The program does the following steps:

1. Examine the state of the "U" bit (PCF1 bit 3). If this bit is not on, the frame will not be forwarded.

2. If U bit is on, then examine the broadcast indicator. If this bit is on, the frame is destined to all rings and the following actions should be taken:
 a. Examine if the limited broadcast (LB) bit is on. If the bit is on and the bridge is configured not to accept any limited broadcast frames (LB Fr) the frame is not forwarded.
 b. Compare the (LTH) with the Hop-count. As stated previously, a set of Hop-count is given to a bridge during its initialization, one for each attached ring. Its purpose is to prevent the broadcast frame from circulating indefinitely. When the bridge sees a broadcast frame, it will compare the length that is in the RI field with Hop-count assigned. If the value of (LTH−2/2) is less than the Hop-count, the frame is transmitted forward. Otherwise, the frame will not be forwarded. The value of (LTH−2/2) is selected because the (RI) field contains 2 (two) bytes and each Bridge Number (BN) is 2 bytes long;
 c. Examine if the Bridge Group (BG) portion of bridge number has appeared in the RI field. If so, this indicates that the frame has returned to the source ring and thus will not be forwarded.
 d. Insert the bridge number into the frame at the location indicated by the length field.
 e. Increment the length by 2.
 f. Forward the frame. This includes the generation of new FCS, S-DEL, PCF-1, E-DEL and PCFE fields.

3. If the "U" bit is on, but the broadcast indicate is not on, then compare the (BN) in the (RI) field (as indicated by the pointer) with the assigned bridge number (BN assigned). If they do not agree, the bridge will not forward the frame. If they agree, then examine the state of "L" bit. If the L bit is "1," the frame will not be forwarded. If "L" bit=0, the following action will be taken:
 a. If LTH=4, only one bridge is specified between the source and the destination. The original FCS is encapsulated and the frame is forwarded using the encapsulated FCS as the CRC of the frame.
 b. If (LTH) does not equal 4, then take the following actions:
  1. If D=0 and the PTR=2, the frame is at the source ring, increment pointer by 2, include the FCS in the I-Field and forward the frame.

If D=0 and PTR=(LTH−2), the frame has arrived at the target ring, reset pointer to 2, turn on L bits, forward the frame without generating a new CRC and use the saved FCS as the CRC of the frame.

If D=0 and PTR is greater than 2 but less than (LTH−2), increment pointer by 2, forward frame and exit the routine.

2. If D=1 and PTR=LTH−2, the frame is at the source ring, decrement the pointer by 2, include FCS in the I-field and forward the frame. If D=1 and PTR=2, the frame has arrived at the target ring. Turn on L bits indicator reset PTR=LTH−2 and forward the frame without generating a new CRC. However, use the save FCS as the CRC for the frame. If D=1 and PTR is greater than 2 but less than (LTH−2), decrement the pointer by 2 and forward the frame.

Figures 5A, 5B:
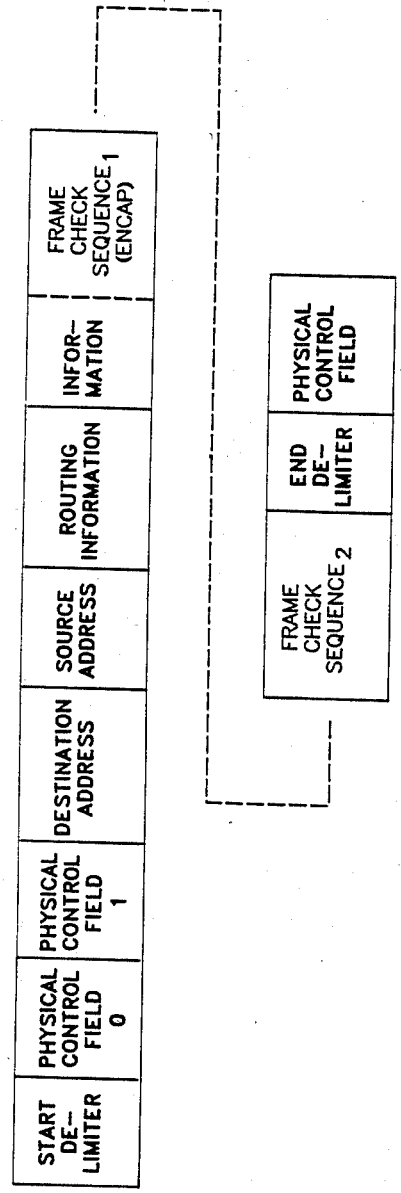
FIGS. 5A-5B shows the format of a frame as it enters and leaves a switching station located on the initiating ring.

FIGS. 5A and 5B show the structure of a frame when it leaves an initiating station and when it leaves the bridge that is located on the initiating ring. When a station prepares a frame for transmission, it is the responsibility of the station to calculate a frame check sequence (FCS) pattern and append the sequence to the frame. The recipient station uses the frame check sequence to test the integrity of the received data.

With multi-ring routing, each bridge that switches the message between rings must also generate and forward an FCS pattern with the frame. As with the recipient station, the recipient bridge uses the transmitted FCS to test the integrity of the received data. To this end, the first bridge, located on the initiating ring, that receives the frame encapsulates the received FCS sequence in the I-field. It then generates its own FCS appends it to the frame and then transmits the frame. With reference to FIG. 5B, $FCS_1$ encapsulate (encap.)

represents the FCS which is received with the frame from an initiating station. Similarly, $FCS_2$ represents the FCS which is prepared by the bridge, on a source ring, and transmitted with the message. Although subsequent bridges along the way replaces $FCS_2$ with their own calculated FCS calculation, the $FCS_1$ encapsulate (encap.) is not disturbed. It is forwarded with the frame. The last bridge in the sequence uses $FCS_1$ encapsulate as the CRC for the frame.

Although FCS calculation does not form part of the present invention, U.S. Pat. No. 3,872,430 issued on Mar. 18, 1975 on application Ser. No. 418,351, filed on Nov. 23, 1973 describes a technique which may be used to calculate the CRS sequence.

In order to maintain end-to-end data integrity, the contents of the RI-field must be restored to its original condition. This may result in a circulating, non-broadcast frame. In order to alleviate this problem, the PTR of the RI-field and the ring number which is given to a bridge port at the initialization time is utilized. When the pointer indicates to a bridge port that it is a target bridge and the ring number in the DA field of the frame is not equal to the ring number that is given to the target bridge port, this means that the frame could be circulating and should be discarded. This technique for detecting a circulated non-broadcast frame is only applicable where the address field is partitioned.

It should be noted that the last bridge indicator (L) bit can also be used to detect a non-broadcast circulating frame. In the preferred embodiment the L bit is used to strip non-broadcast circulating frames. The last bridge indicator bit is set by the last bridge along the route.

Several benefits inure to the user of the above described architecture. Among the benefits are:

Single path routing for each frame. A non-broadcast frame should traverse only the rings necessary to travel from its source to its destination. The frame should not appear on other rings because it would consume their bandwidth unnecessarily and contribute to their congestion.

Consistency with the token ring architecture is provided. Since a bridge is a device that attaches to a ring, preferably it should adhere in its attachment to each ring to the formats and protocols defined in the above-cited IEEE 802.5 standard. Protocols above medium access controls are not affected. The bridge must remain independent of higher level protocols in order for the network of interconnected token rings, like the single ring, to support the logical ring control and higher level protocols of the variety of attached stations.

Independence of location, topology, protocol: The communication protocol between the stations should be independent of there being in the same ring or in different interconnected rings and should be independent of the topology of rings on bridges. Thus, prior knowledge of the physical configuration is not imposed on the attached stations.

The architecture offers dynamic connectivity. The ease of moving a station from one attached point to another while retaining its communication ability is not diminished when the attachment points are in different rings.

The architecture offers reliability and affordability. The architecture for ring interconnection allows the existence of multiple active routes and maintains the same level of end-to-end data integrity as if the stations were in a single ring environment.

While the invention has been particularly shown and described with reference to the preferred embodiments thereof, it will be understood by those skilled in the art that various changes in form and details may be made therein without departing from the spirit and scope of the invention.

Having thus described my invention, what I claim as new, and desire to secure by Letters Patent is:

1. In a telecommunication network system wherein a plurality of serial loop networks are being interconnected by a plurality of switching stations and each serial loop having thereon one or more stations, a method for maintaining end-to-end integrity of data comprising the steps of:
   (a) generating and transmitting from a source station a frame including a destination address, a source address, an RI field and a frame check sequence (FCS) pattern;
   (b) receiving the frame at a switching station connected to the loop;
   (c) preserving the FCS pattern;
   (d) calculating and appending a new FCS pattern to the received frame;
   (e) forwarding the frame;
   (f) receiving the frame at a switching station not connected to the loop;
   (g) calculating and appending a new FCS pattern to the received frame;
   (h) repeating steps (e) through (g) until the last switching station is reached whereby the station does not calculate a new FCS pattern but uses the preserved FCS pattern as the frame CRC.

2. In a telecommunication network system wherein a plurality of serial loop networks are being connected by a plurality of switching stations and each serial loop having one or more utilization stations connected thereto, a method for routing frames between stations comprising the steps of:
   (a) transmitting from a source station a frame including a destination address (DA) field, a source address (SA) field, an RI field containing routing path data, and a frame check sequence (FCS) pattern;
   (b) receiving the frame at a switching station;
   (c) analyzing the frame to determine the position of the switching station relative to the routing path;
   (d) saving the FCS pattern only if the switching station is the first in the routing path;
   (e) calculating and appending a new FCS pattern to the received frame;
   (f) forwarding the frame;
   (g) repeating steps (b) through (f) until the frame arrives at the last station in the routing path wherein a new FCS pattern is not calculated and the saved FCS pattern is used as the FCS pattern for the frame.

3. The method recited in claim 2 wherein the DA and SA field includes a ring number section and a node address (ADDR) section, and the RI field includes a first two-stage directional (D) indicia identifying the order in which the frame will pass through the switching station, and a PTR section showing the next switching station to process said frame.

4. The method of claim 3 wherein the analyzing step further includes the steps of:
   (a) examining the two-state D indicia;
   (b) examining the PTR;
   (c) comparing the value of the PTR with a range of predetermined values; and (d) characterizing the switching station as being first on the route only if the two-state (D) indicia is in a first state and the value of the PTR is within a predetermined range.

5. The method of claim 4 wherein the switching station is being characterized as last on the route only if the two-state (D) indicia is in the opposite state and the PTR value falls within a predetermined range.

6. The method of claim 5 further including the steps of resetting the PTR only if the station is last on the route.

7. The method recited in claim 2 wherein the FCS is being saved by encapsulating it within the I-field of the frame.

8. The method of claim 6 further including a second two-state indicia positioned outside of the RI field.

9. The method of claim 8 further including the steps of setting the second two-state indicia only if the switching station is last on the route.

* * * * *